United States Patent
Xiong et al.

(10) Patent No.: US 11,453,776 B2
(45) Date of Patent: Sep. 27, 2022

(54) POLYLACTIC ACID 3D PRINTING MATERIAL AND PREPARATION METHOD THEREOF

(71) Applicant: KINGFA SCI. & TECH. CO., LTD., Guangdong (CN)

(72) Inventors: Kai Xiong, Guangdong (CN); Zhimin Yuan, Guangdong (CN); Tongmin Cai, Guangdong (CN); Xianbo Huang, Guangdong (CN); Xiangbin Zeng, Guangdong (CN); Jian Jiao, Guangdong (CN); Changli Lu, Guangdong (CN); Hui Yang, Guangdong (CN); Kaijin Mai, Guangdong (CN); Xueteng Dong, Guangdong (CN); Weida Ou, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 321 days.

(21) Appl. No.: 16/956,556

(22) PCT Filed: May 28, 2019

(86) PCT No.: PCT/CN2019/088826
§ 371 (c)(1),
(2) Date: Jun. 20, 2020

(87) PCT Pub. No.: WO2019/237914
PCT Pub. Date: Dec. 19, 2019

(65) Prior Publication Data
US 2021/0024745 A1    Jan. 28, 2021

(30) Foreign Application Priority Data
Jun. 15, 2018 (CN) .......................... 201810618934.X

(51) Int. Cl.
| | | |
|---|---|---|
| *C08L 67/04* | (2006.01) | |
| *B33Y 70/00* | (2020.01) | |
| *B29C 64/314* | (2017.01) | |
| *B33Y 40/10* | (2020.01) | |
| *B29K 67/00* | (2006.01) | |

(52) U.S. Cl.
CPC ............ *C08L 67/04* (2013.01); *B29C 64/314* (2017.08); *B33Y 40/10* (2020.01); *B33Y 70/00* (2014.12); *B29K 2067/046* (2013.01); *C08L 2205/025* (2013.01)

(58) Field of Classification Search
CPC ............... C08L 67/04; C08L 2205/025; C08L 2205/03; B29C 64/314; B29C 48/05; B33Y 40/10; B33Y 70/00; B29K 2067/046; C08K 5/098; C08K 5/20
See application file for complete search history.

(56) References Cited

U.S. PATENT DOCUMENTS

| | | | |
|---|---|---|---|
| 2008/0039579 A1* | 2/2008 | Kimura | ..................... C08J 5/045 524/556 |
| 2008/0097074 A1* | 4/2008 | Ouchi | ..................... C08K 5/21 528/354 |
| 2010/0087556 A1* | 4/2010 | Britton | ..................... C08L 67/04 428/407 |
| 2017/0066188 A1* | 3/2017 | Luo | ..................... D02J 13/005 |
| 2017/0297086 A1 | 10/2017 | DeBruin | |
| 2022/0016828 A1* | 1/2022 | Rodgers | ................. B33Y 40/20 |

FOREIGN PATENT DOCUMENTS

| | | |
|---|---|---|
| CN | 104448738 | 3/2015 |
| CN | 104672826 | 6/2015 |
| CN | 106715100 | 5/2017 |
| CN | 109021515 | 12/2018 |
| WO | 2015069986 | 5/2015 |

OTHER PUBLICATIONS

"International Search Report (Form PCT/ISA/210)" of PCT/CN2019/088826, dated Sep. 2, 2019, with English translation thereof, pp. 1-4.

* cited by examiner

*Primary Examiner* — Nahida Sultana
(74) *Attorney, Agent, or Firm* — JCIPRNET

(57) ABSTRACT

The present invention relates to a polylactic acid 3D printing material and a preparation method thereof, which belong to the technical field of polymer materials. The polylactic acid 3D printing material of the present invention comprises the following preparation raw materials in parts by weight: (a) 40-95 parts of crystalline or semi-crystalline polylactic acid, (b) 5-60 parts of noncrystalline polylactic acid, and (c) 0-1.0 parts of a processing aid. In the polylactic acid 3D printing material, a weight of dextral polylactic acid represents 0.5%-8% of a total weight of the polylactic acid. According to the present invention, a polylactic acid 3D printing material with a good aging resistance property can be obtained, by selecting and using two kinds of polylactic acids with different optical purities as raw materials, rationally distributing the proportional relationship between the two, and defining the content of dextral polylactic acid.

10 Claims, No Drawings

POLYLACTIC ACID 3D PRINTING MATERIAL AND PREPARATION METHOD THEREOF

CROSS-REFERENCE TO RELATED APPLICATION

This application is a 371 of international application of PCT application serial no. PCT/CN2019/088826, filed on May 28, 2019, which claims the priority benefit of China application no. 201810618934.X, filed on Jun. 15, 2018. The entirety of each of the above-mentioned patent applications is hereby incorporated by reference herein and made a part of this specification.

BACKGROUND OF THE INVENTION

1. Technical Field

The present invention relates to a polylactic acid 3D printing material and a preparation method thereof, which belong to the technical field of polymer materials.

2. Description of Related Art

Starch-rich corn can produce colorless and transparent liquid, lactic acid, through modern biotechnology, and then a granular polymer material, polylactic acid (PLA), is produced through a special polymerization process. PLA has the best tensile strength and elongation, and can be produced by various common processing methods, such as, melt extrusion molding, injection molding, blown film molding, foam molding and vacuum molding, etc. However, using PLA as a general-purpose plastic at this stage, especially as a base material for 3D printing consumables, the large-scale promotion and the application thereof are still subject to certain restrictions, which is mainly due to the severe brittleness of polylactic acid and the notched impact strength of less than 3 kJ/m$^2$, severely limiting its wide application. Thus, how to improve the toughness of polylactic acid without affecting its extrusion stability is a problem that must be solved in expanding the application of polylactic acid in 3D printing consumables.

The Chinese patent application entitled "A 3D Printing PLA Consumable and Preparation Method Thereof" (Application No.: 201510069937.9; Publication No.: CN104672826A) provides a 3D printing PLA consumable and a preparation method thereof, where the 3D printing PLA consumable is prepared with the following materials in weight percentage: 99.3-99.7% of PLA plastics, 0.1-0.3% of pigments, 0.2-0.4% of aids, but there is no mention of content of D-polylactic acid and aging property of wire materials.

SUMMARY OF THE INVENTION

The objective of the present invention is to overcome the shortcomings of the prior art and to provide a polylactic acid 3D printing material with a good aging resistance property, and a preparation method thereof.

To achieve the above objective, the technical solution adopted by the present invention is: a polylactic acid 3D printing material, comprising the following preparation raw materials in parts by weight:

(a) 40-95 parts of crystalline or semi-crystalline polylactic acid,
(b) 5-60 parts of noncrystalline polylactic acid, and
(c) 0-1.0 parts of a processing aid;

in the polylactic acid 3D printing material, a weight of dextral polylactic acid represents 0.5%-8% of a total weight of the polylactic acid.

Polylactic acid includes dextral (D-) and sinistral (L-) polylactic acids, and the optical rotation of pure L-polylactic acid is −156° and that of pure D-polylactic acid is 156°. Optical purity directly affects crystallization property and crystallinity of polylactic acid. The higher the optical purity, the faster the crystallization rate of polylactic acid and the higher the crystallinity. As the optical purity decreases, the absolute value of the optical rotation of polylactic acid reduces. The melting point of pure D-polylactic acid or L-polylactic acid can reach 180° C., with a high degree of crystallinity and a very slow degradation rate. While as the optical purity decreases, the melting point and the crystallization property of PLA decrease until PLA becomes amorphous, the degradability of PLA increases, and mechanical property and rheological property thereof also change accordingly. Thus, the properties of the polylactic acid material are closely related to the optical purity thereof.

The above-mentioned crystalline or semi-crystalline polylactic acid acts as a continuous phase, and the noncrystalline polylactic acid as a dispersed phase. According to the present invention, a polylactic acid 3D printing material with a good aging resistance property can be obtained, by selecting and using two kinds of polylactic acids with different optical purities as raw materials, rationally distributing the proportional relationship between the two, and defining the content of the D-polylactic acid. Studies show that a viscosity retention rate of the polylactic acid 3D printing material of the present invention reaches 70% or more after storage in a constant-temperature and -humidity chamber (at a temperature at 60° C. and a humidity of 60%) for 12 days.

In the above technical solution, the total weight of polylactic acid is the sum of the weight of (a) crystalline or semi-crystalline polylactic acid and that of (b) noncrystalline polylactic acid. A test method of D-polylactic acid (the dextrorotatory form of polylactic acid) is as follows: using Agilent HP6890 gas chromatographer, utilizing that the complexes formed by cyclodextrin molecules in the gas chromatography column have different equilibrium constants and different complexation abilities to two enantiomers of polylactic acid, so as to separate the enantiomers easily by gas chromatography, and obtaining the percentage of the two enantiomers in polylactic acid by such method. The specific steps are as follows: 1. preparing a standard solution with known D-polylactic acid content, and recording the peak time of the standard solution in the chromatogram; 2. according to the concentration and peak area of the standard sample, obtaining the standard curve equation; 3. comparing the chromatogram of the sample with that of the polylactic acid standard solution under the same chromatographic conditions, determining L-polylactic acid and D-polylactic acid in the sample according to the retention time; quantifying by using the external standard method, and calculating the D-polylactic acid content (i.e. the content of the dextrorotatory form of polylactic acid) in the sample.

As a preferred embodiment of the polylactic acid 3D printing material of the present invention, the polylactic acid 3D printing material comprises the following preparation raw materials in parts by weight:

(a) 50-90 parts of the crystalline or semi-crystalline polylactic acid,
(b) 10-50 parts of the noncrystalline polylactic acid, and
(c) 0-1.0 parts of the processing aid.

The weight ratio of the crystalline or semi-crystalline polylactic acid to the noncrystalline polylactic acid in the present invention affects the aging resistance property of the obtained polylactic acid 3D printing material. Studies show that within the preferred range of parts by weight, the obtained polylactic acid 3D printing material has better aging resistance property.

As a preferred embodiment of the polylactic acid 3D printing material of the present invention, in the polylactic acid 3D printing material, the weight of D-polylactic acid represents 1.4%-6% of the total weight of the polylactic acid.

As a preferred embodiment of the polylactic acid 3D printing material of the present invention, an average particle size of the noncrystalline polylactic acid is less than 1 µm.

As a preferred embodiment of the polylactic acid 3D printing material of the present invention, the processing aid is a lubricant.

As a further preferred embodiment of the polylactic acid 3D printing material of the present invention, the processing aid is at least one of stearamide, oleamide, erucamide, zinc stearate and a polymer composite ester of metallic soaps, ethylene bis stearamide (EBS), polyethylene wax, and a silicone lubricant. The processing aid may be selected from one, two or more of the substances, but not limited to the substances.

The present invention also provides a method for preparing the above polylactic acid 3D printing material, comprising the following steps:

(1) weighing each substance in the preparation raw materials of the polylactic acid 3D printing material in parts by weight, mixing them evenly to obtain a mixture;

(2) putting the mixture obtained in step (1) into a twin-screw extruder, extruding and granulating to obtain a composition; and (3) drawing wires of the composition obtained in step (2) on a single-screw extruder to obtain the polylactic acid 3D printing material.

The polylactic acid 3D printing material obtained by the above method is a 3D printing wire material.

As a preferred embodiment of the method for preparing the polylactic acid 3D printing material of the present invention, in the step (2), a temperature of the twin-screw extruder is 160-180° C.

As a preferred embodiment of the method for preparing the polylactic acid 3D printing material of the present invention, in the step (3), conditions for drawing wires on the single-screw extruder are as follows: an extrusion speed of drawing wires is 10-60 Kg/h, a wire diameter of wire materials extruded is 1.5-3.5 cm, and a water tank temperature is 40-60° C.

Compared with the prior art, the advantageous effects of the present invention are as follows: according to the present invention, a polylactic acid 3D printing material with a good aging resistance property can be obtained, by selecting and using two kinds of polylactic acids with different optical purities as raw materials, rationally distributing the proportional relationship between the two, and defining the content of D-polylactic acid. Studies show that the viscosity retention rate of the polylactic acid 3D printing material of the present invention reaches 70% or more after storage in a constant-temperature and -humidity chamber (at a temperature at 60° C. and a humidity of 60%) for 12 days.

DETAILED DESCRIPTION OF THE INVENTION

In order to better illustrate the object, technical solutions and advantages of the present invention, the present invention will be further described in combination with specific embodiments below.

In the following embodiments, a method for measuring the material viscosity is as follows: accurately weighing 0.1250±0.0005 g of a sample at 25° C., dissolving the sample in 25 ml of a solution (o-dichlorobenzene:phenol=2:3 in mass ratio), heating at 110° C. with stirring until a resin is completely dissolved, measuring the viscosity by a viscometer, and retaining two digits after the decimal point for the value of viscosity.

The viscosity retention rate is: viscosity after aging/initial viscosity*100%.

Embodiment 1

It is an embodiment of a polylactic acid 3D printing material of the present invention. Preparation raw materials of the polylactic acid 3D printing material described in Embodiment 1 are shown in Table 1.

A preparation method of the polylactic acid 3D printing material described in this embodiment is as follows:

(1) weighing each substance in the preparation raw materials of the polylactic acid 3D printing material in parts by weight, mixing them evenly to obtain a mixture;

(2) putting the mixture obtained in step (1) into a twin-screw extruder, extruding and granulating at 160-180° C. to obtain a composition;

(3) drawing wires of the composition obtained in step (2) on a single-screw extruder to obtain the polylactic acid 3D printing material; wherein conditions for drawing wires on the single-screw extruder are as follows: an extrusion speed of drawing wires is 10-60 Kg/h, a wire diameter of wire materials extruded is 1.5-3.5 cm, and a water tank temperature is 40-60° C., where temperature of the first section water tank is 40° C. while temperature of the second section water tank is 50° C.

Embodiments 2-7

The preparation raw materials of the polylactic acid 3D printing materials described in Embodiments 2-7 are shown in Table 1; the preparation method of the polylactic acid 3D printing materials described in Embodiments 2-7 is the same as that in Embodiment 1.

After placing the polylactic acid 3D printing materials obtained in Embodiments 1 to 7 at a constant temperature and a constant humidity (at a temperature at 60° C. and a humidity of 60%) for 12 days, the viscosity retention rates thereof were measured. Results are shown in Table 1.

TABLE 1

Preparation raw materials and viscosity test results of the polylactic acid 3D printing materials in Embodiments 1-7

| Preparation material | | Embodiment 1 | Embodiment 2 | Embodiment 3 | Embodiment 4 | Embodiment 5 | Embodiment 6 | Embodiment 7 |
|---|---|---|---|---|---|---|---|---|
| crystalline or semi-crystalline PLA | parts by weight/part | 90 | 90 | 80 | 50 | 90 | 95 | 40 |
| noncrystalline PLA | parts by weight/part | 10 | 10 | 20 | 50 | 10 | 5 | 60 |
| | average particle size/μm | 0.5 | 0.3 | 0.7 | 0.8 | 0.95 | 0.5 | 0.3 |
| in PLA 3D printing materials, the percentage of the weight of D-PLA in the total weight of PLA/% | | 2.0 | 2.5 | 3.0 | 6 | 1.4 | 0.5 | 8 |
| processing aid | materials | EBS | EBS | EBS | EBS | zinc stearate | polyethylene wax | oleamide |
| | parts by weight/part | 0 | 0.2 | 0.2 | 0.2 | 0.2 | 0.6 | 1.0 |
| viscosity rentention rate/% | | 75 | 80 | 78 | 76 | 82 | 74 | 74 |

As can be seen from Table 1, polylactic acid 3D printing materials with a good aging resistance property can be obtained by selecting and using two kinds of polylactic acids with different optical purities as raw materials, rationally distributing the proportional relationship between the two, and defining the content of D-polylactic acid according to the present invention. The viscosity retention rates of the polylactic acid 3D printing materials of the present invention reach 70% or more after storage in a constant-temperature and -humidity chamber (at a temperature at 60° C. and a humidity of 60%) for 12 days.

Effect Example 1

The average particle size of the noncrystalline polylactic acid of the present invention will affect the aging resistance property of the obtained polylactic acid 3D printing material. In this effect example, test groups and control groups of the polylactic acid 3D printing materials were prepared according to the method described in Embodiment 1. And after placing the obtained polylactic acid 3D printing materials at a constant temperature and a constant humidity (at a temperature at 60° C. and a humidity of 60%) for 12 days, the viscosity retention rates thereof were measured. Results are shown in Table 2.

Thereinto, the difference between the test groups and the control groups of the polylactic acid 3D printing materials is only in the average particle size of the noncrystalline polylactic acid. Specifically, the test groups and the control groups of the polylactic acid 3D printing materials were prepared with the following preparation raw materials in parts by weight: (a) 40-95 parts of crystalline or semi-crystalline polylactic acid, (b) 5-60 parts of noncrystalline polylactic acid, and (c) 0-1.0 parts of a processing aid; in the polylactic acid 3D printing materials, the weight of D-polylactic acid represents 0.5%-8% of the total weight of the polylactic acid; the processing aid is a lubricant.

TABLE 2

| | Test group 1 | Test group 2 | Test group 3 | Control group 1 | Control group 2 | Control group 3 | Control group 4 |
|---|---|---|---|---|---|---|---|
| average particle size of the noncrystalline PLA/μm | 0.8 | 0.9 | 0.95 | 1.0 | 1.1 | 1.2 | 1.5 |
| viscosity rentention rate/% | 76 | 81 | 82 | 68 | 67 | 65 | 55 |

As can be seen from Table 2, when the average particle size of the noncrystalline polylactic acid is less than 1 μm, the obtained polylactic acid 3D printing materials have better aging resistance properties.

Effect Example 2

This effect example investigates the influence of the water tank temperature on the aging resistance property of the obtained polylactic acid 3D printing material when preparing the polylactic acid 3D printing material.

In this effect example, a test group of the polylactic acid 3D printing material was first prepared according to the method described in Embodiment 1, which was specifically prepared with the following preparation raw materials in parts by weight: (a) 40-95 parts of crystalline or semi-crystalline polylactic acid, (b) 5-60 parts of noncrystalline polylactic acid, and (c) 0-1.0 parts of a processing aid; in the polylactic acid 3D printing material, the weight of D-polylactic acid represents 0.5%-8% of the total weight of the polylactic acid; the average particle size of the noncrystalline polylactic acid is less than 1 μm; the processing aid is a lubricant.

In this effect example, a control group of the polylactic acid 3D printing material was prepared at the same time, and the difference between the test group and the control group of the polylactic acid 3D printing materials is only in that: the water tank temperature is 65-75° C. during preparation.

The viscosity retention rates of the test group and the control group of the polylactic acid 3D printing materials were investigated, which results are shown in Table 3.

TABLE 3

|  | Test group | Control group |
|---|---|---|
| viscosity rentention rate/% | 78 | 60 |

As can be seen from Table 3, the polylactic acid 3D printing material prepared by the method of the present invention has the better aging resistance property.

Effect Example 3

The weight ratio of the crystalline or semi-crystalline polylactic acid to the noncrystalline polylactic acid in the present invention affects the aging resistance property of the obtained polylactic acid 3D printing material. In this effect example, by changing the weight ratio of the crystalline or semi-crystalline polylactic acid to the noncrystalline polylactic acid, different test groups and control groups of polylactic acid 3D printing materials were prepared according to the method described in Embodiment 1, and the aging resistance property of each test group and control group of polylactic acid 3D printing materials was tested. In this effect example, the test groups and control groups of polylactic acid 3D printing materials were prepared with the following preparation raw materials: (a) crystalline or semi-crystalline polylactic acid, (b) noncrystalline polylactic acid, and (c) a processing aid; in the polylactic acid 3D printing materials, the weight of D-polylactic acid represents 0.5%-8% of the total weight of the polylactic acid; the average particle size of the noncrystalline polylactic acid is less than 1 μm; the processing aid is a lubricant; the processing aid is 0-1.0 parts by weight. The difference of each test group and control group is only in the parts by weight of the crystalline or semi-crystalline polylactic acid and the noncrystalline polylactic acid. The parts by weight of the two and their aging resistance properties are shown in Table 4.

TABLE 4

|  | Test group 1 | Test group 2 | Test group 3 | Test group 4 | Test group 5 | Control group 1 | Control group 2 | Control group 3 | Control group 4 |
|---|---|---|---|---|---|---|---|---|---|
| crystalline or semi-crystalline PLA/part by weight | 90 | 50 | 80 | 95 | 40 | 35 | 30 | 97 | 98 |
| noncrystalline PLA/part by weight | 10 | 50 | 20 | 5 | 60 | 65 | 70 | 3 | 2 |
| viscosity rentention rate/% | 78 | 77 | 78 | 74 | 74 | 65 | 56 | 63 | 60 |

As can been seen from Table 4, when the weight ratio of the crystalline or semi-crystalline polylactic acid to the noncrystalline polylactic acid is within the range of the present invention, the aging resistance property of the obtained polylactic acid 3D printing material is significantly better than that in the situation that the weight ratio of the two is out of the range. Especially when the weight ratio of the two is (50-90):(10-50), the aging resistance property of the obtained polylactic acid 3D printing material is better.

Effect Example 4

This effect example investigates the influence of the weight percentage of D-polylactic acid in the polylactic acid 3D printing material on the aging resistance property of the obtained polylactic acid 3D printing material when preparing the polylactic acid 3D printing material.

In this effect example, by changing the weight percentage of D-polylactic acid in the polylactic acid 3D printing material, different test groups and control groups of polylactic acid 3D printing materials were prepared according to the method described in Embodiment 1, and the aging resistance property of each test group and control group of polylactic acid 3D printing materials was tested. In this effect example, the test groups and control groups of polylactic acid 3D printing materials were prepared with the following preparation raw materials in parts by weight: (a) 40-95 parts of crystalline or semi-crystalline polylactic acid, (b) 5-60 parts of noncrystalline polylactic acid, and (c) 0-1.0 parts of a processing aid; the average particle size of the noncrystalline polylactic acid is less than 1 μm; the processing aid is a lubricant. The difference of each test group and control group of the polylactic acid 3D printing materials is only in the weight percentage of D-polylactic acid, and the weight percentages of D-polylactic acid and the aging resistance properties are shown in Table 5.

TABLE 5

|  | Test group 1 | Test group 2 | Test group 3 | Test group 4 | Test group 5 | Control group 1 | Control group 2 | Control group 3 | Control group 4 |
|---|---|---|---|---|---|---|---|---|---|
| in PLA 3D printing materials, the percentage of the weight of D-PLA in the total weight of PLA | 1.4 | 6 | 4.0 | 0.5 | 8 | 0.3 | 0.2 | 8.5 | 9 |
| viscosity rentention rate/% | 81 | 77 | 78 | 75 | 74 | 68 | 65 | 60 | 50 |

As can been seen from Table 5, when the weight percentage of D-polylactic acid in polylactic acid 3D printing materials is within the range of the present invention, the aging resistance property of the obtained polylactic acid 3D printing material is significantly better than that in the situation that the weight percentage is out of the range. Especially when the weight percentage is 1.4%-6%, the aging resistance properties of the obtained polylactic acid 3D printing materials are better.

Finally, it should be noted that the above embodiments are only used to illustrate the technical solutions of the present invention rather than limiting the scope of protection of the present invention. Although the present invention has been described in detail with reference to the preferred embodiments, those of ordinary skill in the art should understand that the technical solutions of the present invention may be modified or equivalently replaced without departing from the spirit and scope of the technical solutions of the present invention.

What is claimed is:

1. A polylactic acid 3D printing material, comprising the following preparation raw materials in parts by weight:
    (a) 40-95 parts of crystalline or semi-crystalline polylactic acid,
    (b) 5-60 parts of noncrystalline polylactic acid, and
    (c) 0-1.0 parts of a processing aid;
    in the polylactic acid 3D printing material, a weight of dextral polylactic acid represents 0.5%-8% of a total weight of the polylactic acid.

2. The polylactic acid 3D printing material according to claim 1, wherein the polylactic acid 3D printing material comprises the following preparation raw materials in parts by weight:
    (a) 50-90 parts of the crystalline or semi-crystalline polylactic acid,
    (b) 10-50 parts of the noncrystalline polylactic acid, and
    (c) 0-1.0 parts of the processing aid.

3. The polylactic acid 3D printing material according to claim 1, wherein in the polylactic acid 3D printing material, the weight of the dextral polylactic acid represents 1.4%-6% of the total weight of the polylactic acid.

4. The polylactic acid 3D printing material according to claim 1, wherein an average particle size of the noncrystalline polylactic acid is less than 1 μm.

5. The polylactic acid 3D printing material according to claim 1, wherein the processing aid is a lubricant.

6. The polylactic acid 3D printing material according to claim 1, wherein the processing aid is at least one selected from the group of stearamide, oleamide, erucamide, zinc stearate, a polymer composite ester of metallic soaps, ethylene bis stearamide, polyethylene wax, and a silicone lubricant.

7. A method for preparing the polylactic acid 3D printing material according to claim 1, characterized in that, comprising the following steps of:
    (1) weighing each substance in the preparation raw materials of the polylactic acid 3D printing material in parts by weight, mixing them evenly to obtain a mixture;
    (2) putting the mixture obtained in step (1) into a twin-screw extruder, extruding and granulating to obtain a composition; and
    (3) drawing wires of the composition obtained in step (2) on a single-screw extruder to obtain the polylactic acid 3D printing material.

8. The method for preparing the polylactic acid 3D printing material according to claim 7, wherein in the step (2), a temperature of the twin-screw extruder is 160-180° C.

9. The method for preparing the polylactic acid 3D printing material according to claim 7, wherein in the step (3), conditions for drawing wires on the single-screw extruder are as follows: an extrusion speed of drawing wires is 10-60 kg/h, a wire diameter of wire materials extruded is 1.5-3.5 cm, and a water tank temperature is 40-60° C.

10. The polylactic acid 3D printing material according to claim 2, wherein in the polylactic acid 3D printing material, the weight of the dextral polylactic acid represents 1.4%-6% of the total weight of the polylactic acid.

* * * * *